(12) United States Patent
Wentink

(10) Patent No.: US 9,320,020 B2
(45) Date of Patent: Apr. 19, 2016

(54) SYSTEMS AND METHODS FOR PARTIAL AID SELECTION

(71) Applicant: QUALCOMM Incorporated, San Diego, CA (US)

(72) Inventor: Maarten Menzo Wentink, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 13/935,319

(22) Filed: Jul. 3, 2013

(65) Prior Publication Data

US 2014/0010177 A1    Jan. 9, 2014

Related U.S. Application Data

(60) Provisional application No. 61/669,448, filed on Jul. 9, 2012.

(51) Int. Cl.
*H04W 72/04* (2009.01)
*H04W 8/26* (2009.01)
(Continued)

(52) U.S. Cl.
CPC ............ *H04W 72/0406* (2013.01); *H04W 8/26* (2013.01); *H04W 52/0212* (2013.01); *H04W 76/021* (2013.01); *H04L 61/6004* (2013.01)

(58) Field of Classification Search
CPC .............. H04L 61/6004; H04L 29/12735; H04L 61/3073; H04W 52/0212; H04W 72/0406; H04W 76/021; H04W 8/26; H04W 8/22; H04W 72/04; H04B 1/38
USPC .................. 370/252, 235, 311, 328–330, 338
See application file for complete search history.

(56) References Cited

U.S. PATENT DOCUMENTS

| 7,374,099 B2 | 5/2008 | de Jong |
| 7,577,125 B2 * | 8/2009 | Abhishek .............. H04W 72/02 370/328 |

(Continued)

FOREIGN PATENT DOCUMENTS

WO    WO-2012068384 A2    5/2012

OTHER PUBLICATIONS

IEEE P802.11ac/D3.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz., Jun. 2012, 385 pages.

(Continued)

*Primary Examiner* — Mohamed Kamara
(74) *Attorney, Agent, or Firm* — Knobbe Martens Olson & Bear LLP

(57) ABSTRACT

Systems, methods, and devices for communicating in a wireless network are provided. In one aspect, a non-zero portion of a node identifier may be used to generate a partial association identifier. If no portion of the node identifier can be determined to be non-zero, then a default value may be used for the partial association identifier. In some other aspects, the partial association identifier may be based on a random number. In some other aspects, a portion of a node identifier is evaluated to determine if it is zero. If the portion is non-zero, a partial association identifier is generated based on the portion. If the portion is zero, a partial association identifier is generated based on the portion.

56 Claims, 8 Drawing Sheets

(51) Int. Cl.
*H04W 52/02* (2009.01)
*H04W 76/02* (2009.01)
*H04L 29/12* (2006.01)

(56) References Cited

U.S. PATENT DOCUMENTS

| | | | | |
|---|---|---|---|---|
| 8,971,213 | B1* | 3/2015 | Hart | H04W 8/26 370/255 |
| 9,014,153 | B2* | 4/2015 | Park | H04W 48/16 370/336 |
| 2008/0144591 | A1* | 6/2008 | Jokela | H04W 48/12 370/338 |
| 2011/0149878 | A1* | 6/2011 | Ahmadi | H04W 48/20 370/329 |
| 2011/0317630 | A1 | 12/2011 | Zhu et al. | |
| 2012/0063335 | A1 | 3/2012 | Cho et al. | |
| 2012/0224521 | A1 | 9/2012 | Zhu et al. | |
| 2012/0300684 | A1 | 11/2012 | Wentink | |
| 2012/0327862 | A1 | 12/2012 | Lee et al. | |
| 2013/0044687 | A1 | 2/2013 | Liu et al. | |
| 2013/0109385 | A1* | 5/2013 | Cheng | H04W 36/0066 455/436 |

OTHER PUBLICATIONS

IEEE Std 802.11-2012 (Revision of IEEE Std 802.11-2007), IEEE Standard for Information technology—Telecommunications and information exchange between systems Local and metropolitan area network—Specific requirements Part 11: Wireless LAN Medium Access Control (MAC) and Physical Layer (PHY) Specifications, Mar. 29, 2012, 2793 pages.
Partial International Search Report—PCT/US2013/049482—ISA/EPO—Feb. 10, 2014.
Prepared by the 802.11 Working Group of the 802 Committee: "IEEE P802.11ac/D0.1; Part 11: Wireless LAN Medium Access Control (MAC) and Physical Layer (PHY) specification", Jan. 28, 2011, pp. 1-176, XP055029327, Three Park Avenue New York, New York 10016-5997, USA Retrieved from the Internet: URL:http//www.ieee.org[retrieved on Jun. 8, 2012] par.9.7e table 22-1.

* cited by examiner

SYSTEMS AND METHODS FOR PARTIAL AID SELECTION

CROSS REFERENCE TO RELATED APPLICATIONS

This application claims the benefit of U.S. Provisional Application 61/669,448, filed Jul. 9, 2012, and entitled "SYSTEMS AND METHODS FOR PARTIAL AID SELECTION", and assigned to the assignee hereof. The disclosure of this prior application is considered part of this application, and is hereby incorporated by reference in its entirety

BACKGROUND

1. Field

The present application relates generally to wireless communications, and more specifically to systems, methods, and devices for communicating SIGNAL units. Certain aspects herein relate to generating and decoding SIGNAL units for use with various communication modes.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the overhead in transmitting payloads in data packets.

One aspect disclosed is a method of generating a partial association identifier for use in wireless communications. The method includes generating the partial association identifier based on a random number, and transmitting a wireless frame including the generated partial association identifier. In some aspects, the random number has a lower bound of one (1).

Another aspect disclosed is an apparatus for generating a partial association identifier for use in wireless communications. The apparatus includes a processor configured to generate the partial association identifier based on a random number, and a transmitter configured to transmit a wireless frame including the generated partial association identifier. In some aspects, the processor is configured to generate the partial association identifier based on a random number with a lower bound of one (1).

Another aspect disclosed is an apparatus for generating a partial association identifier for use in wireless communications. The apparatus includes means for generating the partial association identifier based on a random number, and means for transmitting a wireless frame including the generated partial association identifier. In some aspects, the means for generating is configured to generate the partial association identifier based on a random number with a lower bound of one (1).

Another aspect disclosed is a non-transitory computer readable medium comprising instructions that when executed cause a processor to perform a method. The method includes generating the partial association identifier based on a random number, and transmitting a wireless frame including the generated partial association identifier.

In some aspects, the random number has a lower bound of one (1). Another aspect disclosed is a method of generating a partial association identifier for use in wireless communications. The method includes determining if a portion of a node identifier is zero, and generating the partial association identifier based on the determining. In some aspects, the node identifier is a basic service set identifier. In some aspects, the basic service set identifier is a media access control address. In some aspects, the partial association identifier is generated based on a random number if the portion of the node identifier is zero. In some aspects, the method further includes transmitting a wireless frame including the generated partial association identifier.

Another aspect disclosed is an apparatus for generating a partial association identifier for use in wireless communications. The apparatus includes a processor configured to determine if a portion of a node identifier is zero, and a processor configured to generate the partial association identifier based on the determining. In some aspects, the node identifier is a basic service set identifier. In some aspects, the basic service set identifier is a media access control address. In some aspects, the processor is configured to generate the partial association identifier on a random number if the portion of the node identifier is zero. In some aspects, the transmitter is further configured to transmit a wireless frame including the generated partial association identifier.

Another aspect disclosed is an apparatus for generating a partial association identifier for use in wireless communications. The apparatus includes means for determining if a portion of a node identifier is zero, and means for generating the partial association identifier based on the determining. In some aspects, the node identifier is a basic service set identifier. In some aspects, the basic service set identifier is a media access control address. In some aspects, the means for generating the partial association identifier is configured to generate the partial association identifier based on a random number if the means for determining determines that the portion of the node identifier is zero. In some aspects, the apparatus also includes means for transmitting a wireless frame including the generated partial association identifier.

Another aspect discloses is a non transitory computer readable medium comprising instructions that when executed cause a processor to perform a method. The method includes determining if a portion of a node identifier is zero, and generating the partial association identifier based on the determining. In some aspects, the node identifier is a basic service set identifier. In some aspects, the basic service set identifier is a media access control address. In some aspects, the partial association identifier is generated based on a random number if the portion of the node identifier is zero. In some aspects, the method also includes transmitting a wireless frame including the generated partial association identifier.

Another aspect disclosed is a method of generating a partial association identifier for use in wireless communications. The method includes determining if a portion of a node identifier is zero, and generating the partial association identifier based on the determining. In some aspects, the node identifier is a basic service set identifier. In some aspects, the basic service set identifier is a media access control address. In some aspects, the partial association identifier is generated based on a random number if the portion of the node identifier is zero. In some aspects, the method also includes transmitting a wireless frame including the generated partial association identifier.

Another aspect disclosed is an apparatus for generating a partial association identifier for use in wireless communications. The apparatus includes a processor configured to determine if a portion of a node identifier is zero, and generate the partial association identifier based on the determining. In some aspects, the node identifier is a basic service set identifier. In some aspects, the basic service set identifier is a media access control address. In some aspects, the partial association identifier is generated based on a random number if the portion of the node identifier is zero. In some aspects, the apparatus also includes a transmitter configured to transmit a wireless frame including the generated partial association identifier.

Another aspect disclosed is an apparatus for generating a partial association identifier for use in wireless communications. The apparatus includes means for determining if a portion of a node identifier is zero, and means for generating the partial association identifier based on the determining. In some aspects, the node identifier is a basic service set identifier. In some aspects, the basic service set identifier is a media access control address. In some aspects, the means for generating is configured to generate the partial association identifier based on a random number if the portion of the node identifier is zero. In some aspects, the apparatus also includes means for transmitting a wireless frame including the generated partial association identifier.

Another aspect disclosed is a non-transitory computer readable medium comprising instructions that when executed cause a processor to perform a method. The method includes determining if a portion of a node identifier is zero, and generating the partial association identifier based on the determining. In some aspects, the node identifier is a basic service set identifier. In some aspects, the basic service set identifier is a media access control address. In some aspects, the partial association identifier is generated based on a random number if the portion of the node identifier is zero. In some aspects, the method also includes transmitting a wireless frame including the generated partial association identifier.

Another aspect disclosed is a method of generating a partial association identifier for use in wireless communications. The method includes generating the partial association identifier based on a first portion of a node identifier if the first portion is not zero, and generating the partial association identifier based on a second portion of the node identifier if the second portion is not zero and the first portion is zero. In some aspects, the node identifier is a basic service set identifier. In some aspects, the method also includes transmitting a wireless frame including the generated partial association identifier. In some aspects, the method also includes generating the partial association identifier based on a third portion of a node identifier if the third portion is not zero and the first and second portions are zero. In some aspects, the method also includes generating the partial association identifier based on a default value if a non-zero portion of the node identifier is not determined.

Another aspect disclosed is an apparatus for generating a partial association identifier for use in wireless communications. The apparatus includes a processor configured to generate the partial association identifier based on a first portion of a node identifier if the first portion is not zero, and generate the partial association identifier based on a second portion of the node identifier if the second portion is not zero and the first portion is zero. In some aspects, the node identifier is a basic service set identifier. In some aspects, the apparatus also includes a transmitter configured to transmit a wireless frame including the generated partial association identifier. In some aspects, the apparatus also includes a processor configured to generate the partial association identifier based on a third portion of a node identifier if the third portion is not zero and the first and second portions are zero. In some aspects, the apparatus also includes a processor configured to generate the partial association identifier based on a default value if a non-zero portion of the node identifier is not determined.

Another aspect disclosed is an apparatus for generating a partial association identifier for use in wireless communications. The apparatus includes means for generating the partial association identifier based on a first portion of a node identifier if the first portion is not zero, and means for generating the partial association identifier based on a second portion of the node identifier if the second portion is not zero and the first portion is zero. In some aspects, the node identifier is a basic service set identifier. In some aspects, the apparatus also includes means for transmitting a wireless frame including the generated partial association identifier. In some aspects, the apparatus also includes means for generating the partial association identifier based on a third portion of a node identifier if the third portion is not zero and the first and second portions are zero. In some aspects, the apparatus also includes means for generating the partial association identifier based on a default value if a non-zero portion of the node identifier is not determined.

Another aspect disclosed is a non-transitory computer readable medium comprising instructions that when executed cause a processor to perform the method of generating the partial association identifier based on a first portion of a node identifier if the first portion is not zero, and generating the partial association identifier based on a second portion of the node identifier if the second portion is not zero and the first portion is zero. In some aspects, the node identifier is a basic service set identifier. In some aspects, the method also includes transmitting a wireless frame including the generated partial association identifier. In some aspects, the method also includes generating the partial association identifier based on a third portion of a node identifier if the third portion is not zero and the first and second portions are zero. In some aspects, the method also includes generating the partial association identifier based on a default value if a non-zero portion of the node identifier is not determined.

DETAILED DESCRIPTION

Figure 1:
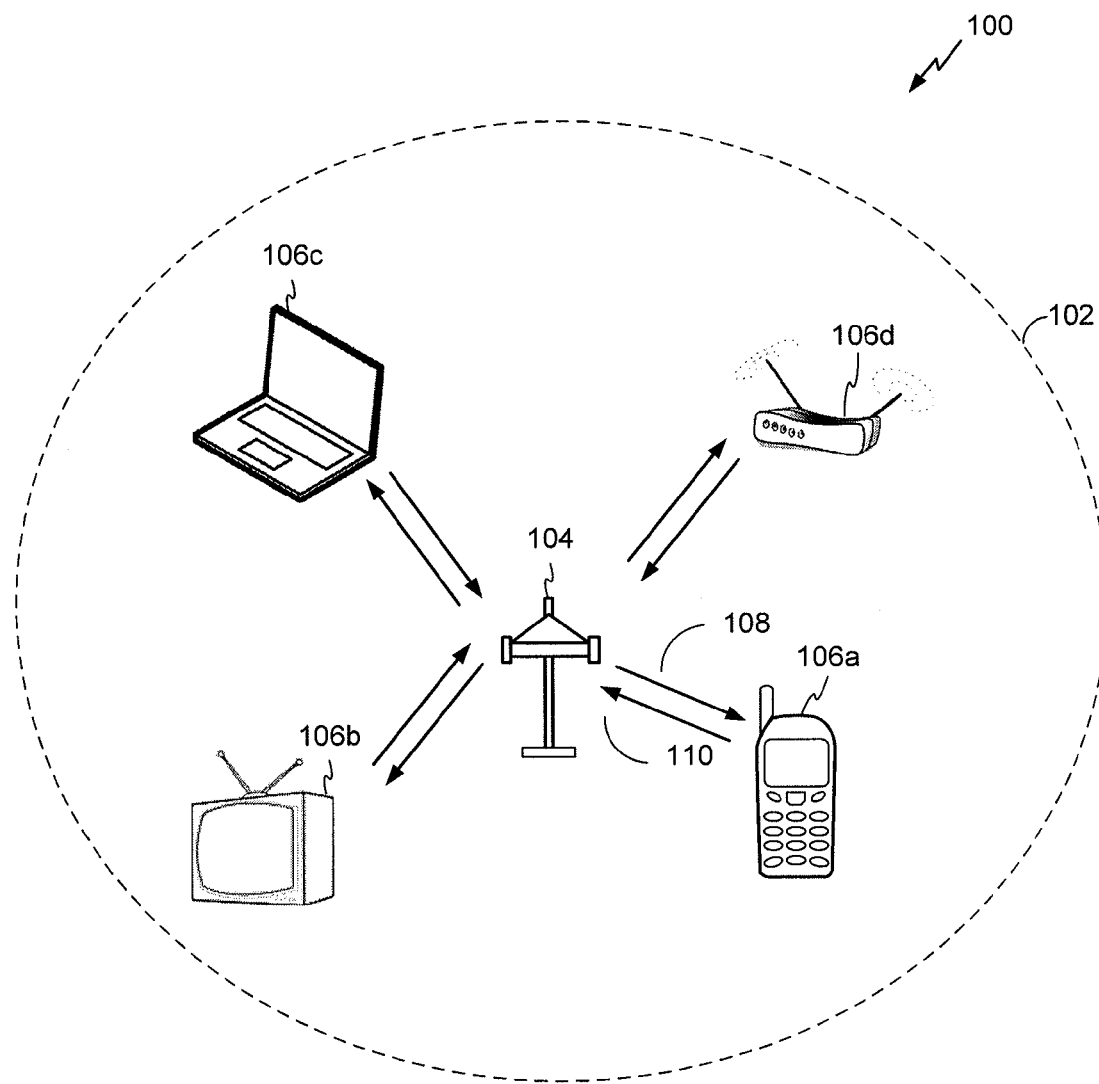
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Such devices may be designed so as to reduce cost and power consumption. For example, some devices utilizing the 802.11ah standard may have limited battery capacity and limited transmit power. These devices may be designed to enter a sleep state or avoid unnecessary processing to improve their power efficiency. For example, some devices may receive only a portion of a wireless frame to reduce power consumption. A portion of a wireless frame may be received so as to determine whether the frame is destined for the device receiving it. If the device determines that it is not the intended destination for the frame, the device may not receive a remaining portion of the frame to save power.

Additionally, wireless protocols may be designed to facilitate reduced power consumption by these devices. For example, frames of a reduced size may be provided that require less power to receive than frames of a larger size. In some embodiments, because these reduced frames may omit particular fields or data, these reduced size frames may inhibit a device's ability to enter a sleep state. Therefore, methods and apparatus for improving a device's ability to enter a sleep state and save power when using smaller wireless frames is desired.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
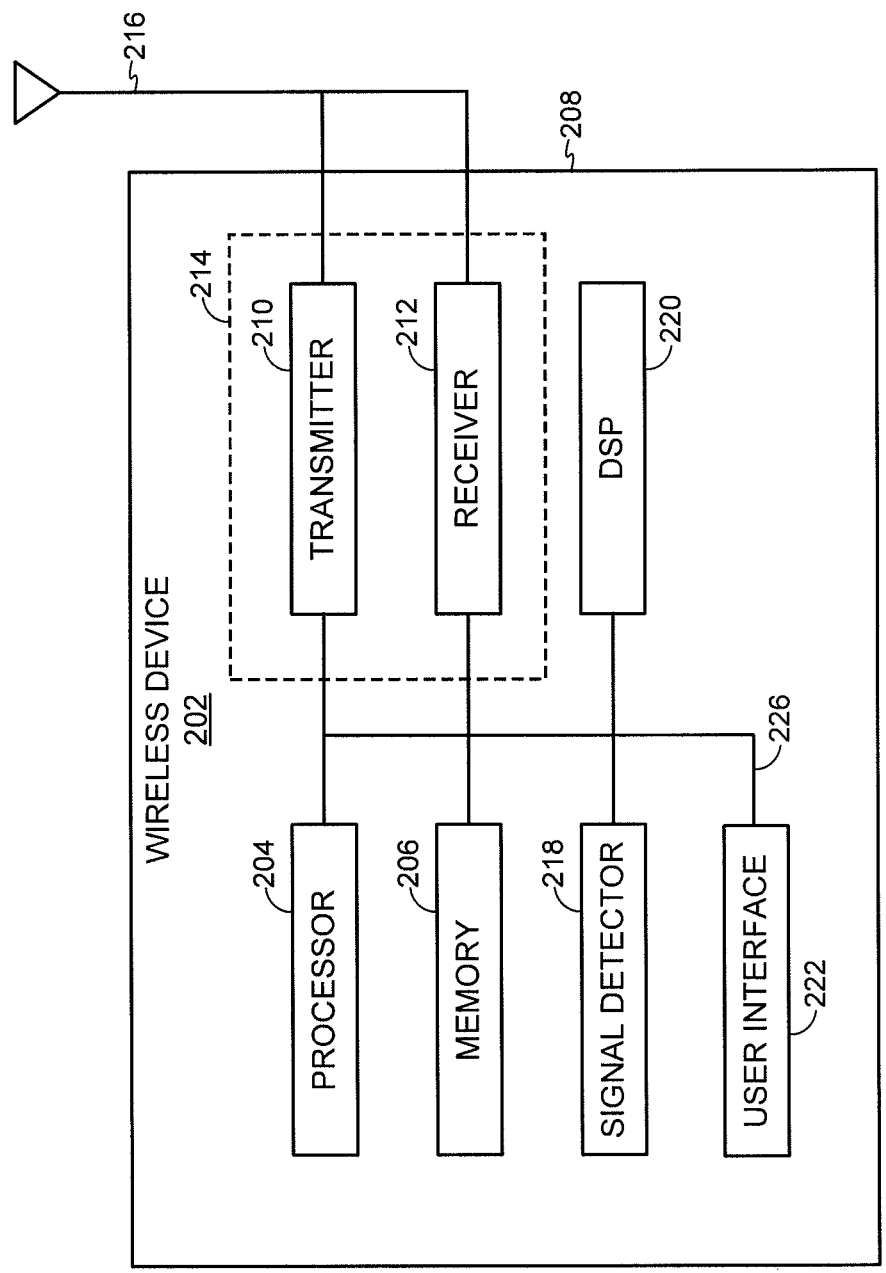
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
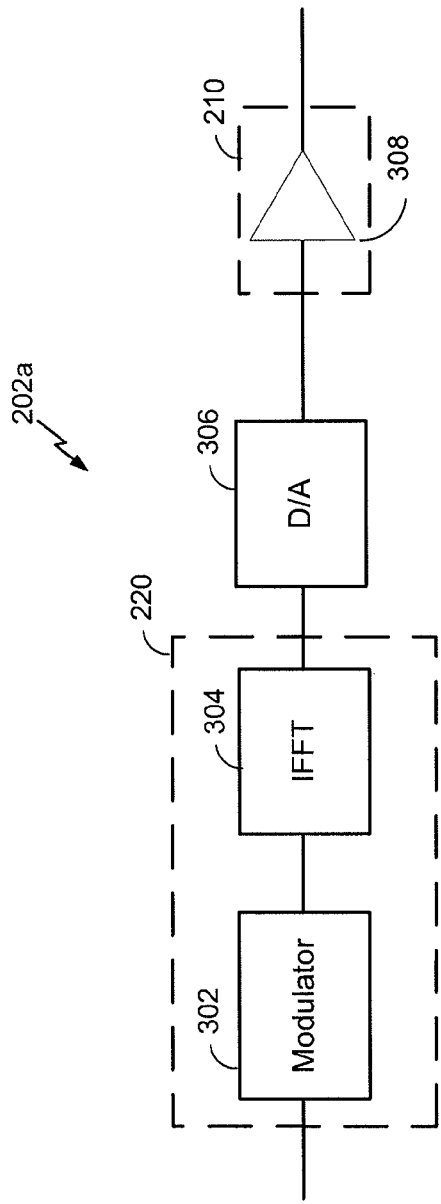
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with SIGNAL units in various communication modes, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter (DAC) 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets or data units in a wireless signal based on the analog signal. The data units may be generated using the processor 204 and/or the DSP 220, for example using the modulator 302 and the transform module 304 as discussed above. Data units that may be generated and transmitted as discussed above are described in additional detail below with respect to FIGS. 5-10.

Figure 4:
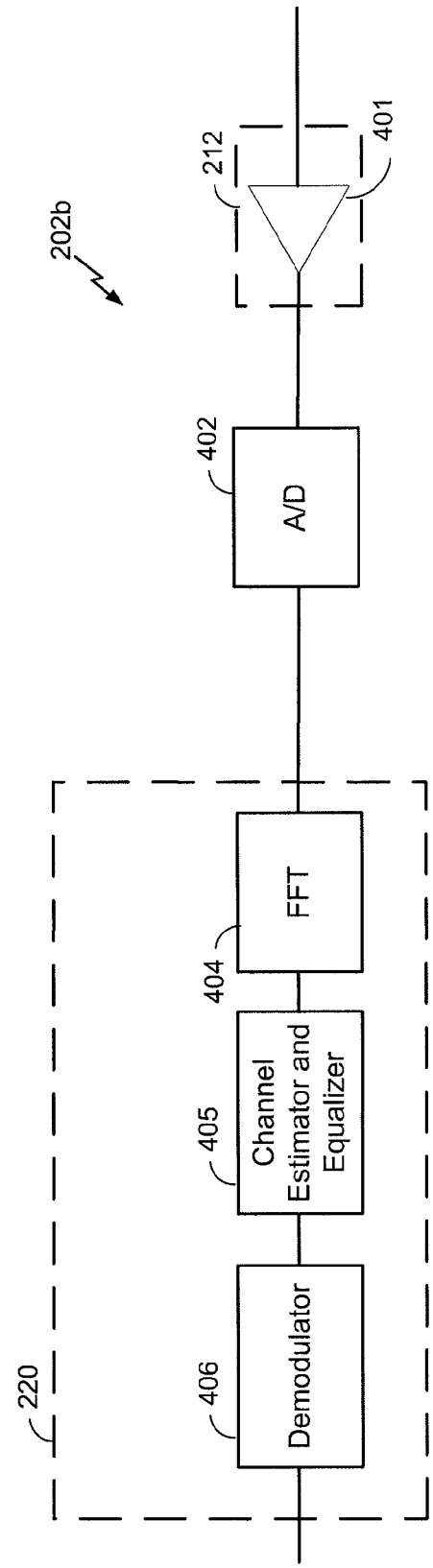
FIG. 4 shows a functional block diagram of exemplary components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units that include one or more SIGNAL units, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets or data units in a wireless signal. Data units that may be received and decoded or otherwise processed as discussed below are described in additional detail with respect to FIGS. 5-9.

In the aspect illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. The transform module 404 may be programmable, and may be configured to perform FFT with different configurations. In one aspect, for example, the transform module 404 may be configured to perform either a 32-point FFT or a 64-point FFT. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. In various embodiments, data units can include Mac Protocol Data Units (MPDU) and/or Aggregated Mac Protocol Data Units (A-MPDU). The payload may be transmitted using one or more data symbols. The systems, methods, and devices herein may utilize data units with training fields whose peak-to-power ratio has been minimized.

The data units may be transmitted, for example, in a 1 MHz mode or a 2 MHz mode. The preamble may be common for a 1 MHz normal mode and for a 1 MHz 2× repetition mode. In a 2 MHz mode, the SIG field may span 52 data tones. In some embodiments, a SIG field may be replicated every 2 MHz for transmissions greater than 2 MHz. In addition, for transmission greater than 2 MHz, there may be 2 SIG-A fields and 1 SIG-B field for MU mode. In some embodiments, in a 1 MHz mode there may be 6 SIG A fields. In a 1 MHz mode, the SIG field may span 24 data tones. In some embodiments, the 2 MHz PHY transmission is an OFDM based waveform consisting of 64 tones (52 data tones, 4 pilot tones, 7 guard tones, and 1 DC tone). The tone spacing for other bandwidth modes may be the same as the tone spacing for a 2 MHz mode. In some embodiments, a 1 MHz mode includes 32 tones (24 data tones, 2 pilot tones, 5 guard tones, and 1 DC tone).

Figure 5:
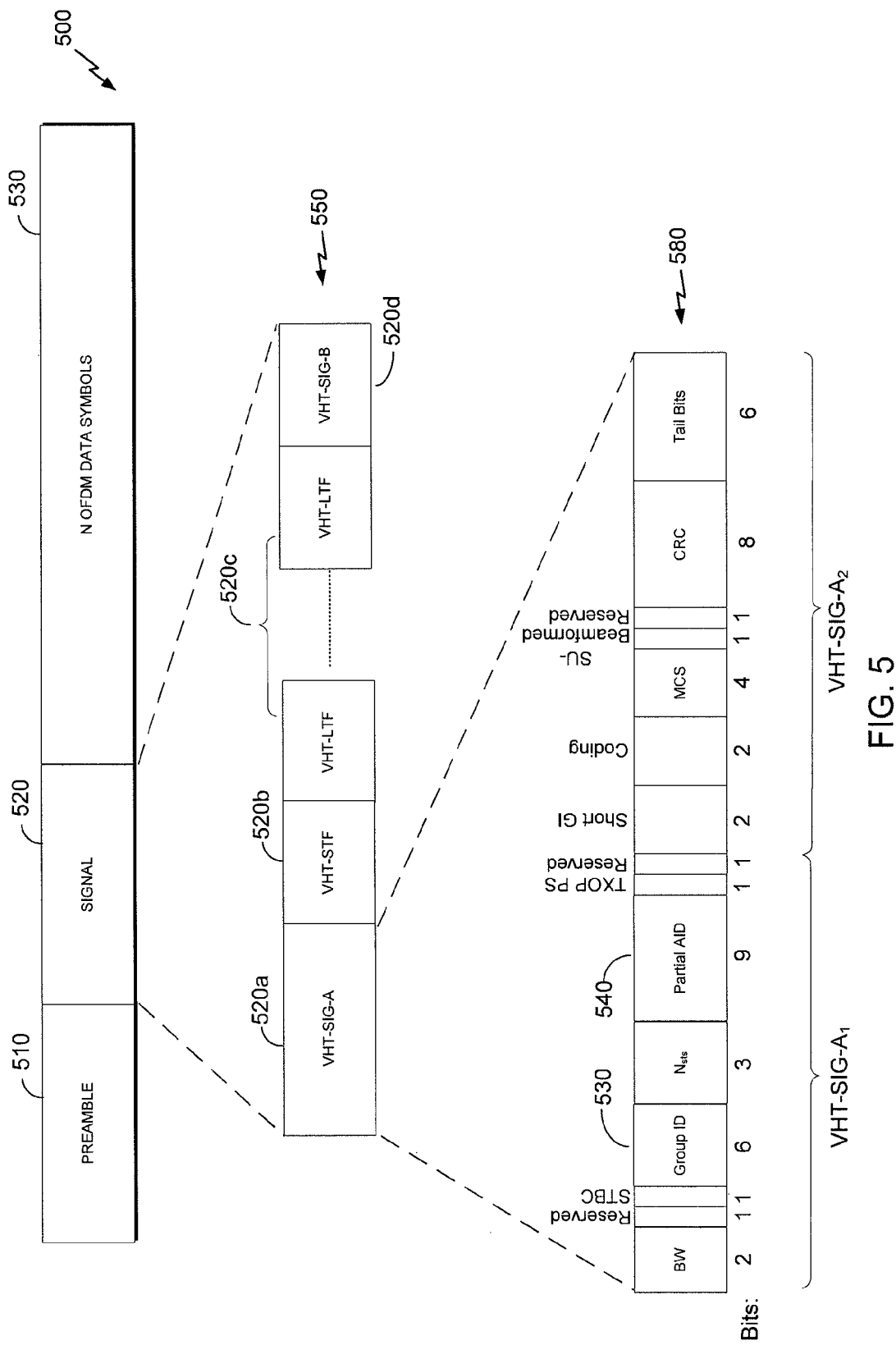
FIG. 5 illustrates an example of a data unit or wireless frame.

FIG. 5 illustrates an example of a data unit or wireless frame 500. The data unit 500 may comprise a PPDU for use with the wireless device 202. In an embodiment, the data unit 500 may be used by legacy devices or devices implementing a legacy standard or downclocked version thereof.

The data unit 500 includes a preamble 510. Following the preamble 510 in the data unit 500 is a SIGNAL unit 520. In an embodiment, the SIGNAL may be one OFDM signal that includes various information relating to the transmission rate, the length of the data unit 500, and the like. The data unit 500 additionally includes a variable number of data symbols 530, such as OFDM data symbols. In an embodiment, the preamble 510 can include the SIGNAL unit 520. In an embodiment, one or more of the data symbols 530 can be a payload.

The data unit 500 illustrated in FIG. 5 is only an example of a data unit that may be used in the system 100 and/or with the wireless device 202. Those having ordinary skill in the art will appreciate that one or more symbols or fields may be included in the data unit 500 that are not illustrated in FIG. 5, and one or more of the illustrated fields or symbols may be omitted.

In some embodiments, the signal field 520 is of a format shown by frame portion 550. The signal field 550 is shown including a VHT-SIG-A field 520a, VHT-STF field 520b, and between one and eight VHT-LTF fields 520C. Frame portion 550 also includes a VHT-SIG-B field 520d. The VHT-SIG-A field 520a may be arranged as shown in frame portion 580. Frame portion 580 includes several fields, to include a group id field 530 and a partial association identifier field 540.

In an embodiment, the group id field 530 may be zero if the packet is addressed to an access point or to a mesh station. The group id field 530 may be set to all ones (0x111111) otherwise. The group id field 530 may be utilized by receivers of frame 500 to determine whether the frame is an uplink frame or a downlink frame. For example, a station may receive the group id field 530 of wireless frame 500 and determine the frame is destined for an access point or a mesh STA because the group id field 530 is zero, as described above. After this determination, the STA may discontinue receiving a remaining portion of the frame. By discontinuing reception of the frame after the group id is received, some embodiments of stations may save power.

In an embodiment, the partial association identifier field (PAID) 540 is an abbreviated indication of the intended recipient for the frame 500. In some embodiments, wireless frames destined for an access point include a PAID field based on a portion of a node identifier of the access point. In an embodiment, the node identifier is the access point's basic service set identifier (BSSID). In some embodiments, the BSSID of an access point is the access point's media access control (MAC) address. In some embodiments, a portion of an access point's MAC address may be zero. If the portion of the access point's basic service set identifier used to determine the PAID field is zero, the PAID field may also be zero.

The PAID field may be used by each STA 106 as an early indicator of whether the STA 106 should receive and decode the remainder of the wireless frame 500. For example, if the PAID field indicates that the wireless frame 500 is not intended for a particular STA 106, that STA 106 may discontinue processing the data unit 500 in order to save power. A PAID field equal to zero may indicate a broadcast receiver address, indicating the frame including the zero PAID should be received by all devices.

As discussed above, some stations may monitor the group ID 530 of a frame to determine whether they should receive the frame. A non-mesh station receiving a wireless frame with a group id 530 of zero may determine that the wireless frame is not destined to the station. When the group id 530 is zero, the station may not even examine or interpret the PAID field of the wireless frame. In these packets, if the PAID field is zero, no negative effects may result, as the station can determine not to receive the frame based on the group id field.

Some implementations of wireless networks may utilize different versions of a wireless frame 500 to reduce overhead or the power required to receive the wireless frame. For example, some embodiments may utilize a wireless frame that is physically shorter, or includes fewer bytes, than frame 500. In some of these embodiments, wireless frame 500 may be modified to at least not include the group id field 530. In these embodiments, stations may no longer determine based on the group id field whether a frame is an uplink frame or a downlink frame. In these embodiments, the station may have an increased reliance on the PAID field when determining whether a wireless frame should be received relative to embodiments using frame 500, which includes the group id field 530. As discussed above, a partial AID field indicates a broadcast frame, indicating that all stations should receive the frame. If a zero valued partial AID field is received without an accompanying group id field, an uplink packet sent by a station to an access point may be received by another station as a broadcast packet. This may occur if a portion of the access point's basic service set identifier used to generate the partial AID field is zero.

Embodiments generating PAID fields may need to avoid generating a zero valued PAID field for a non-broadcast wireless frame, least it be unintentionally interpreted by a receiver as a broadcast PAID field. This may be more important in embodiments utilizing a wireless frame that does not include a group id field 530.

Figure 6A:
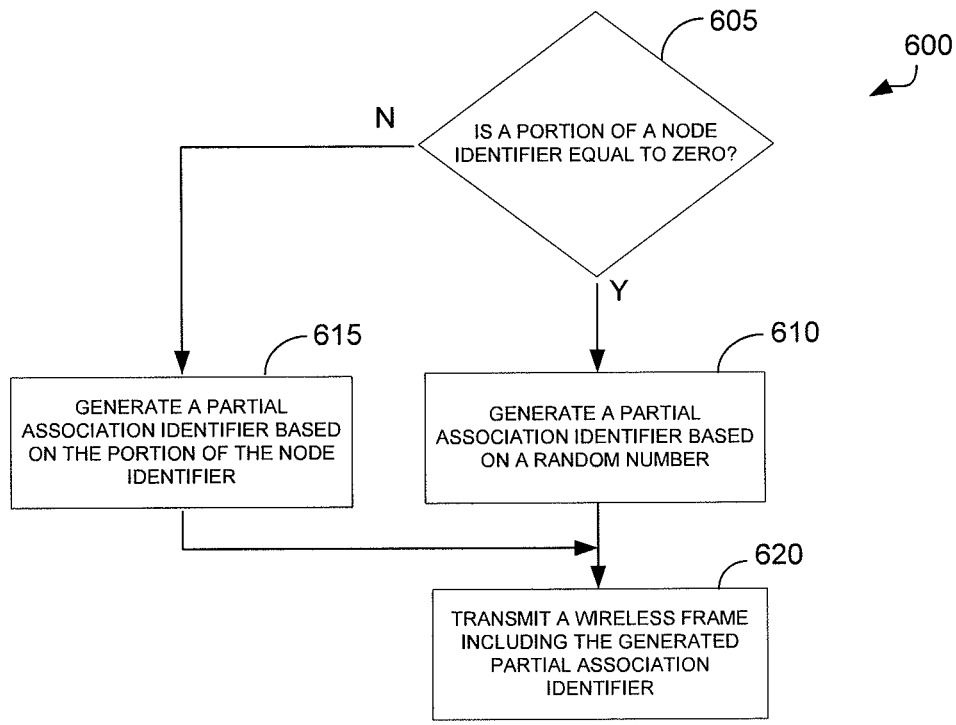
FIG. 6A shows a flow chart of an aspect of an exemplary method for generating and transmitting a wireless frame including a partial association identifier.

FIG. 6A shows a flow chart of an aspect of an exemplary method for generating and transmitting a wireless frame including a partial association identifier. The method 600 may be used to generate any of the data units and SIGNAL units described above. The wireless frame may be generated at either an AP or a STA and transmitted to another device in the wireless network. Although the method 600 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 605 determines whether a portion of a node identifier is equal to zero. In an embodiment, the node identifier may be a basic service set identifier. In an embodiment, the node may be a station or an access point. In an embodiment, the basic service set identifier may be a MAC address of the node. If the portion of the node identifier is not equal to zero, a partial association identifier is generated based on the portion of the node identifier in block 615. If the portion of the node identifier is zero in decision block 605, then a partial association identifier is generated based on a random number in block 610. In block 620, a wireless frame that includes the generated partial association identifier is transmitted.

Figure 6B:
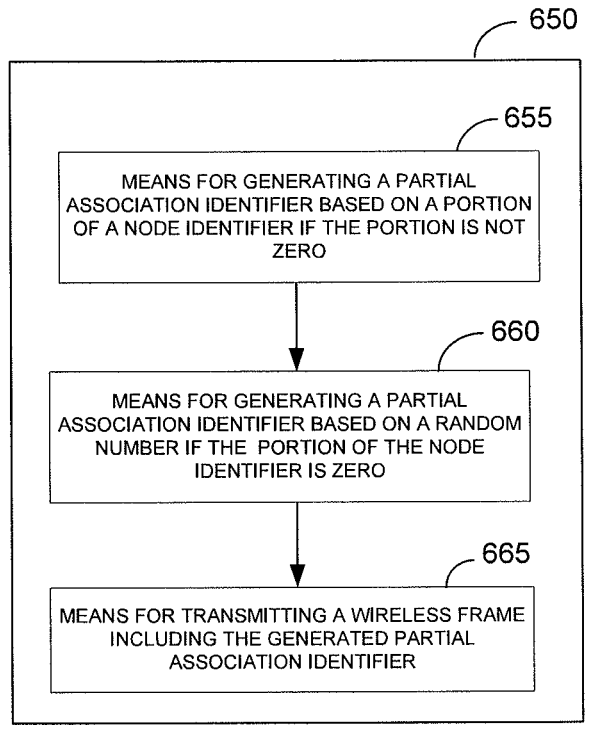
FIG. 6B is a functional block diagram of an exemplary device that may be employed within the wireless communication system 100.

FIG. 6B is a functional block diagram of an exemplary device 650 that may be employed within the wireless communication system 100. The device 650 includes means 655 for generating a partial association identifier based on a portion of a node identifier if the portion is not zero. In an embodiment, means 655 may be configured to perform one or more of the functions discussed above with respect to block 605 and 615. In an embodiment, the means 655 for generating a partial association identifier based on a portion of a node identifier if the portion is not zero may include a processor, such as processor 204 of FIG. 2. Means 655 may also include one or more of a processor, signal generator, transceiver, decoder, or a combination of hardware and/or software component(s), circuits, and/or module(s).

The device 650 further includes means 660 for generating a partial association identifier based on a random number if the portion of the node identifier is zero. In an embodiment, means 660 may be configured to perform one or more of the functions discussed above with respect to block 605 and 610. The means 660 for generating a partial association identifier based on a random number if the portion of the node identifier is zero may comprise a processor, such as processor 204 of FIG. 2. Means 660 may also include one or more of a processor, signal generator, transceiver, decoder, or a combination of hardware and/or software component(s), circuits, and/or module(s).

The device 650 further includes means 665 for transmitting a wireless frame including the generated partial association identifier. In an embodiment, means 665 may be configured to perform one or more of the functions discussed above with respect to block 620. The means 665 for transmitting a wireless frame including the generated partial association identifier may comprise a transmitter, such as transmitter 210 of FIG. 2. Means 665 may also include one or more of a processor, signal generator, transceiver, decoder, or a combination of hardware and/or software component(s), circuits, and/or module(s).

Figure 7A:
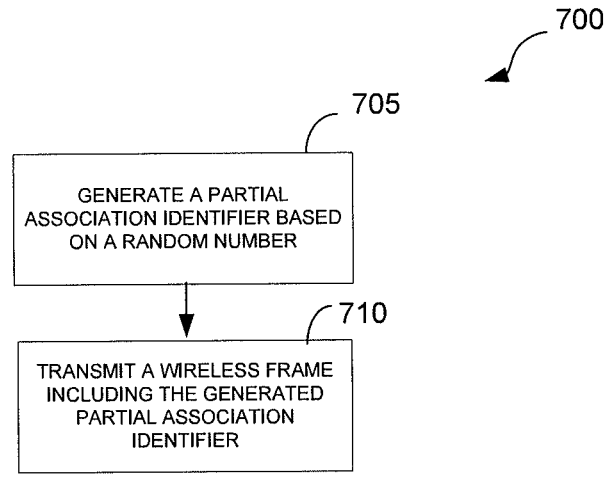
FIG. 7A shows a flow chart of an aspect of an exemplary method for generating and transmitting a wireless frame including a partial association identifier.

FIG. 7A shows a flow chart of an aspect of an exemplary method for generating and transmitting a wireless frame including a partial association identifier. The method 700 may be used to generate any of the data units and SIGNAL units described above. The wireless frame may be generated at either an AP or a STA and transmitted to another device in the wireless network. Although the method 700 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 705 generates a partial association identifier based on a random number.

In an embodiment, the random number has a lower bound of one (1). In an embodiment, the partial association identifier is six bits. In an embodiment, the random number has an upper bound of sixty three (63) (0x111111). In block 710, a wireless frame that includes the generated partial association identifier is transmitted.

Figure 7B:
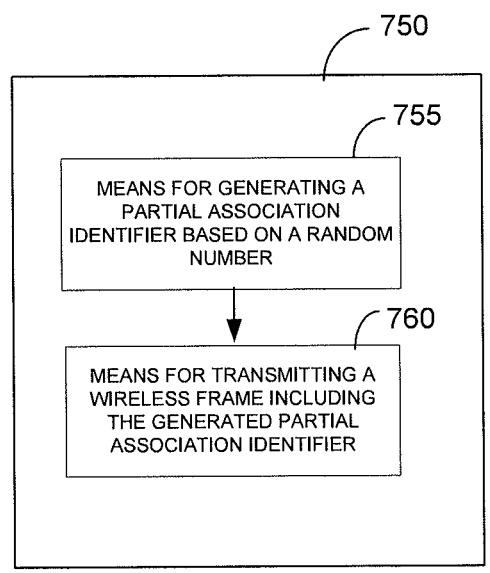
FIG. 7B is a functional block diagram of an exemplary device that may be employed within the wireless communication system 100.

FIG. 7B is a functional block diagram of an exemplary device 750 that may be employed within the wireless communication system 100. The device 750 includes means 755 for generating a partial association identifier based on a random number. In an embodiment, means 755 may be configured to perform one or more of the functions discussed above with respect to block 705. In an embodiment, the means 755 for generating a partial association identifier based on a random number may include a processor, such as processor 204 of FIG. 2. Means 755 may also include one or more of a processor, signal generator, transceiver, decoder, or a combination of hardware and/or software component(s), circuits, and/or module(s).

The device 750 further includes means 760 for transmitting a wireless frame including the generated partial association identifier. In an embodiment, means 760 may be configured to perform one or more of the functions discussed above with respect to block 710. The means 760 for transmitting a wireless frame including the generated partial association identifier may comprise a transmitter, such as transmitter 210 of FIG. 2. Means 760 may also include one or more of a processor, signal generator, transceiver, decoder, or a combination of hardware and/or software component(s), circuits, and/or module(s).

Figure 8A:
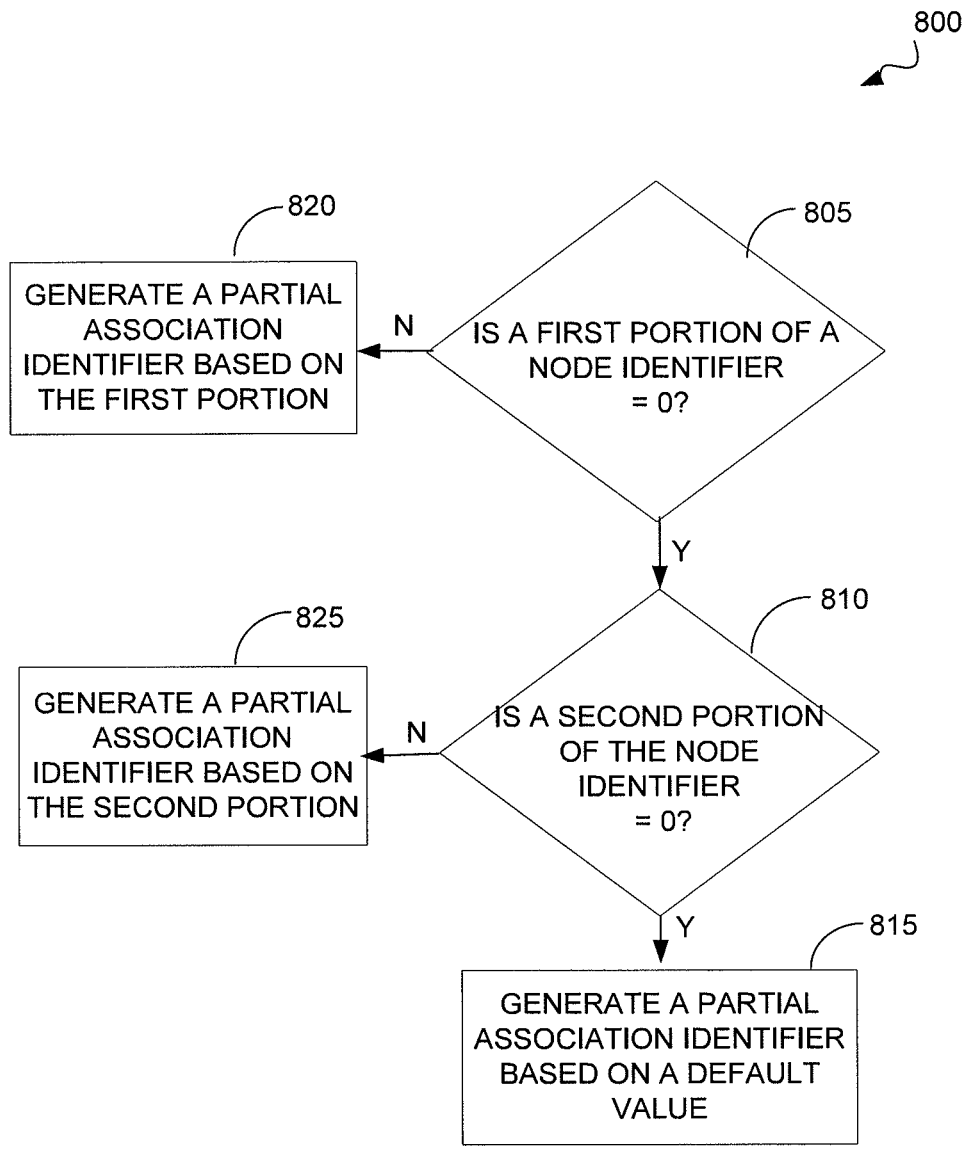
FIG. 8A shows a flow chart of an aspect of an exemplary method for generating and transmitting a wireless frame including a partial association identifier.

FIG. 8A shows a flow chart of an aspect of an exemplary method for generating and transmitting a wireless frame including a partial association identifier. The method 800 may be used to generate any of the data units and SIGNAL units described above. The wireless frame may be generated at either an AP or a STA and transmitted to another device in the wireless network. Although the method 800 is described below with respect to elements of the wireless device 202 (FIG. 2), those having ordinary skill in the art will appreciate that other components may be used to implement one or more of the steps described herein. Although blocks may be described as occurring in a certain order, the blocks can be reordered, blocks can be omitted, and/or additional blocks can be added.

Block 805 determines whether a first portion of a node identifier is equal to zero. In an embodiment, the node identifier may be a basic service set identifier. In an embodiment, the basic service set identifier may be a media access control address. In an embodiment, the node may be an access point. In an embodiment, the node may be a station. If the first portion is not zero, block 820 generates a partial association identifier based on the first portion.

If the first portion is zero, block 810 determines whether a second portion of the node identifier is zero. If the second portion is not zero, block 825 generates a partial association identifier based on the second portion. If the second portion is zero, a partial association identifier is generated based on a default value. In some embodiments, the default value is one.

While process 800 is illustrated evaluating, in some embodiments, a first and second portion, one will skill in the art would understand that other embodiments could evaluate more than two portions of a node identifier. For example, one embodiment of process 800 may evaluate up to 3, 4, 5, 6, 7, 8, 9, or 10 portions of a node identifier. In one embodiment, portions may be defined based on a basic service set identifier. In an embodiment, the BSSID may be for an access point or a station.

In an embodiment, a first portion may be defined based on bits 39-47 of a BSSID. A second portion may be based on bits 31-39 of the BSSID. A third portion may be based on bits 23-31 of the BSSID. A fourth portion may be based on bits 15-23 of the BSSID. A fifth portion may be based on bits 7-15 of the BSSID. A sixth portion may be based on bits 0-8 of the BSSID. If none of the first through sixth portions are non-zero, then a partial AID may be generated based on a default value. For example, the default value may be one (1). As the above example embodiment demonstrates, a first portion of a node identifier may overlap with a second portion of a node identifier.

One advantage of process 800 when generating a partial association identifier compared to other methods is that process 800 may reduce the probability of mapping multiple BSSIDs or MAC addresses to the same partial association identifier.

For example, in some other methods, a partial association identifier may be determined based on the following equation:

Partial Association Identifier=dec(BSSID[39:47]) mode (29−1)+1.

Such a solution avoids a partial association identifier of zero, but may result in both dec(BSSID[39:47])=0 and dec (BSSID[39:47])=512 mapping to a partial association identifier of one (1). Therefore, BSSID[39:47] values of zero (0) and 512 have a higher probability of a collision (1/256 instead of 1/512). This probability of a collision may be aggravated by the birthday paradox.

Process 800 may reduce the probability of a collision when compared to the above method. For example, in one embodiment of process 800, each bit of the BSSID is evaluated until a non zero value is found. When a non-zero bit is found a partial association identifier is generated based on a portion of the BSSID including the non-zero bit. If the BSSID is all zeroes, then the partial association identifier is set to a default value, in one aspect, one (1). This embodiment results in only two BSSID's being mapped to the same partial association identifier, those two BSSID's being zero and one (1). However, these BSSID values very rarely occur in practice. Therefore, the probability of a partial association identifier collision between two BSSIDs may be reduced relative to other methods. For example, in some aspects, the probability of a partial association identifier collision is 1/512. In some aspects using process 800, the probability of a collision will be less than 1/256. In an embodiment, non-contiguous portions of a node identifier may be combined to generate a partial association identifier. The bit order of the non-contiguous portions in the node identifier may be different than the bit order of the non-contiguous portions in the generated partial association identifier. For example, high order portions of a node identifier may be low order portions in a generated partial association identifier.

In some embodiments, a portion of the partial association identifier may have a fixed value and not be derived from a node identifier. For example, an embodiment may set the lowest order two bits to 0x11, and the higher order bits may be derived from a node identifier.

When a non-zero portion is identified, a partial association identifier may be generated based on the identified portion. If no portion of the node identifier is determined to be non-zero, then a partial association identifier may be generated based on a default value.

Figure 8B:
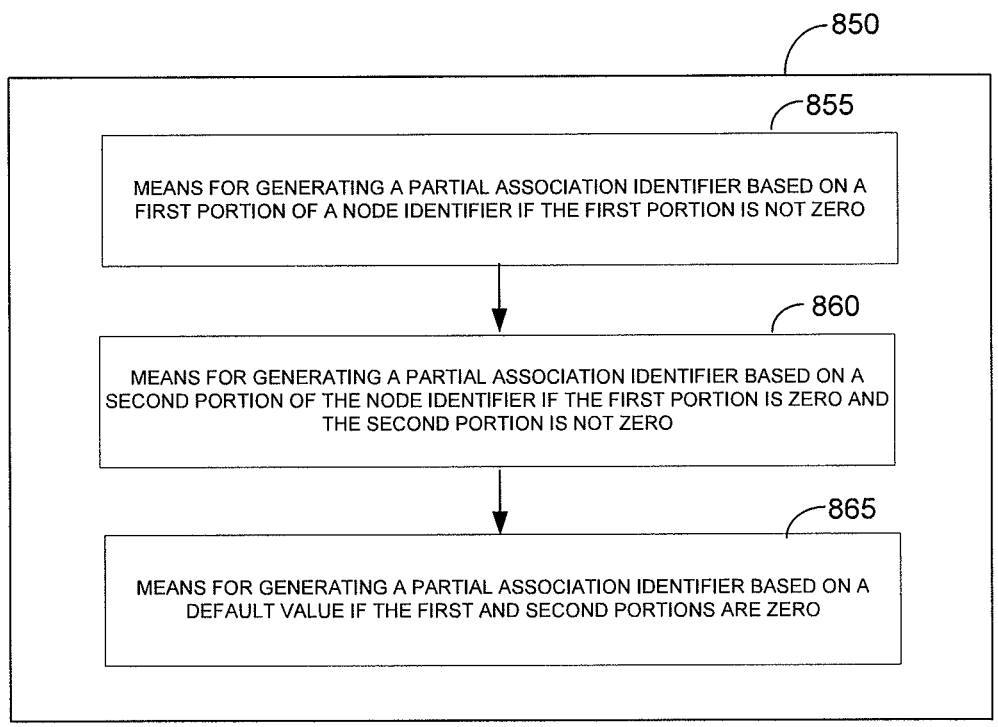
FIG. 8B is a functional block diagram of an exemplary device that may be employed within the wireless communication system 100.

FIG. 8B is a functional block diagram of an exemplary device 850 that may be employed within the wireless communication system 100. The device 850 includes means 855 for generating a partial association identifier based on a first portion of a node identifier if the first portion is not zero. In an embodiment, means 855 may be configured to perform one or more of the functions discussed above with respect to block 805 and/or block 820. In an embodiment, the means 855 for generating a partial association identifier based on a first portion of a node identifier may include a processor, such as processor 204 of FIG. 2. Means 855 may also include one or more of a processor, signal generator, transceiver, decoder, or a combination of hardware and/or software component(s), circuits, and/or module(s).

The device 850 further includes means 860 for generating a partial association identifier based on a second portion of a node identifier if the first portion is zero and the second portion is not zero. In an embodiment, means 860 may be configured to perform one or more of the functions discussed above with respect to blocks 810 and/or 825. The means 860 for generating a partial association identifier based on a second portion of a node identifier if the first portion is zero and the second portion is not zero may comprise a processor, such as processor 204 of FIG. 2. Means 860 may also include one or more of a processor, signal generator, transceiver, decoder, or a combination of hardware and/or software component(s), circuits, and/or module(s).

The device 850 further includes means 865 for generating a partial association identifier based on a default value if the first and second portion are zero. In an embodiment, means 865 may be configured to perform one or more of the functions discussed above with respect to block 815. In an embodiment, the means 865 for generating a partial association identifier based on a default value may include a processor, such as processor 204 of FIG. 2. Means 865 may also include one or more of a processor, signal generator, transceiver, decoder, or a combination of hardware and/or software component(s), circuits, and/or module(s).

As used herein, the term "determining" encompasses a wide variety of actions.

For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL); or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of generating a partial association identifier for use in wireless communications comprising:
   generating, by the first wireless device, the partial association identifier based on a random number;
   generating, by the first wireless device, a signal field including the partial association identifier; and
   transmitting, by the first wireless device, a wireless frame on the wireless network including the generated signal field.

2. The method of claim 1, wherein the random number has a lower bound of one (1).

3. An apparatus for generating a partial association identifier for use in wireless communications, comprising:
   a processor configured to:
     generate the partial association identifier based on a random number,
     generate a signal field including the partial association identifier; and
   a transmitter configured to transmit a wireless frame including the generated signal field.

4. The apparatus of claim 3, wherein the processor is configured to generate the partial association identifier based on a random number with a lower bound of one (1).

5. An apparatus for generating a partial association identifier for use in wireless communications, comprising:
   means for generating the partial association identifier based on a random number;
   means for generating a signal field including the partial association identifier; and
   means for transmitting a wireless frame including the generated signal field.

6. The apparatus of claim 5, wherein the means for generating is configured to generate the partial association identifier based on a random number with a lower bound of one (1).

7. A non-transitory computer readable medium comprising instructions that when executed cause a processor to perform a method of generating a partial association identifier for use in wireless communications, the method comprising:
   generating the partial association identifier based on a random number;
   generating a signal field including the partial association identifier; and
   transmitting a wireless frame including the generated signal field.

8. The non-transitory computer readable medium of claim 7, wherein the random number has a lower bound of one (1).

9. A method of generating a partial association identifier for use in wireless communications, comprising:
   determining, with the first wireless device, if a portion of a node identifier of the first wireless device is zero; and
   generating by the first wireless device, the partial association identifier based on the determining; and
   transmitting, by the first wireless device, the wireless frame including the generated partial association identifier.

10. The method of claim 9, wherein the node identifier is a basic service set identifier.

11. The method of claim 10, wherein the basic service set identifier is a media access control address.

12. The method of claim 9, wherein the partial association identifier is generated based on a random number if the portion of the node identifier is zero.

13. An apparatus for generating a partial association identifier for use in wireless communications, comprising:
   a processor configured to determine if a portion of a node identifier of the apparatus is zero;
   a processor configured to generate the partial association identifier based on the determining; and
   a transmitter configured to transmit the wireless frame including the generated partial association identifier.

14. The apparatus of claim 13, wherein the node identifier is a basic service set identifier.

15. The apparatus of claim 14, wherein the basic service set identifier is a media access control address.

16. The apparatus of claim 13, wherein the processor is configured to generate the partial association identifier based on a random number if the portion of the node identifier is zero.

17. An apparatus for generating a partial association identifier for use in wireless communications, comprising:
   means for determining if a portion of a node identifier of the apparatus is zero;
   means for generating the partial association identifier based on the determining; and means for transmitting a wireless frame including the generated partial association identifier.

18. The apparatus of claim 17, wherein the node identifier is a basic service set identifier.

19. The apparatus of claim 18, wherein the basic service set identifier is a media access control address.

20. The apparatus of claim 17, wherein the means for generating the partial association identifier is configured to generate the partial association identifier based on a random number if the means for determining determines that the portion of the node identifier is zero.

21. A non transitory computer readable medium comprising instructions that when executed cause a processor to perform a method of generating a partial association identifier for use in wireless communications, the method comprising:
determining, by a wireless device, if a portion of a node identifier of the wireless device is zero;
generating, by the wireless device, the partial association identifier based on the determining; and
transmitting, by the wireless device, a wireless frame including the generated partial association identifier.

22. The non transitory computer readable medium of claim 21, wherein the node identifier is a basic service set identifier.

23. The non transitory computer readable medium of claim 22, wherein the basic service set identifier is a media access control address.

24. The non transitory computer readable medium of claim 21, wherein the partial association identifier is generated based on a random number if the portion of the node identifier is zero.

25. A method of generating a partial association identifier for use in wireless communications comprising:
determining, by the first wireless device, if a portion of a node identifier of the first wireless device is zero; and
generating, by the first wireless device, the partial association identifier based on a random number in response to the portion of the node identifier being zero; and
transmitting, by the wireless device, a wireless frame including the generated partial association identifier.

26. The method of claim 25, wherein the node identifier is a basic service set identifier.

27. The method of claim 26, wherein the basic service set identifier is a media access control address.

28. The method of claim 25, wherein the partial association identifier is generated based on a random number if the portion of the node identifier is zero.

29. An apparatus for generating a partial association identifier for use in wireless communications, comprising:
a processor configured to:
determine if a portion of a node identifier of the apparatus is zero, and
generate the partial association identifier based on a random number in response to the portion of the node identifier being zero and
a transmitter configured to transmit a wireless frame including the generated partial association identifier.

30. The apparatus of claim 29, wherein the node identifier is a basic service set identifier.

31. The apparatus of claim 30, wherein the basic service set identifier is a media access control address.

32. The apparatus of claim 29, wherein the partial association identifier is generated based on a random number if the portion of the node identifier is zero.

33. An apparatus for generating a partial association identifier for use in wireless communications, comprising:
means for determining if a portion of a node identifier is zero;
means for generating the partial association identifier based on a random number in response to the portion of the node identifier being zero; and
means for transmitting a wireless frame including the generated partial association identifier.

34. The apparatus of claim 33, wherein the node identifier is a basic service set identifier.

35. The apparatus of claim 34, wherein the basic service set identifier is a media access control address.

36. The apparatus of claim 33, wherein the means for generating is configured to generate the partial association identifier based on a random number if the portion of the node identifier is zero.

37. A non-transitory computer readable medium comprising instructions that when executed cause a processor to perform a method of generating a partial association identifier for use in wireless communications, the method comprising:
determining if a portion of a node identifier is zero;
generating the partial association identifier based on a random number in response to the portion of the node identifier being zero; and
transmitting a wireless frame including the generated partial association identifier.

38. The non-transitory computer readable medium of claim 37, wherein the node identifier is a basic service set identifier.

39. The non-transitory computer readable medium of claim 38, wherein the basic service set identifier is a media access control address.

40. The non-transitory computer readable medium of claim 37, wherein the partial association identifier is generated based on a random number if the portion of the node identifier is zero.

41. A method of generating a partial association identifier for use in wireless communications, comprising:
generating, by the first wireless device, the partial association identifier based on a first portion of a node identifier of the first wireless device if the first portion is not zero;
generating, by the first wireless device, the partial association identifier based on a second portion of the node identifier of the first wireless device if the second portion is not zero and the first portion is zero; and
transmitting, by the first wireless device, a wireless frame including the generated partial association identifier.

42. The method of claim 41, wherein the node identifier is a basic service set identifier.

43. The method of claim 41, further comprising: generating the partial association identifier based on a third portion of a node identifier if the third portion is not zero and the first and second portions are zero.

44. The method of claim 41, further comprising generating the partial association identifier based on a default value if a non-zero portion of the node identifier is not determined.

45. An apparatus for generating a partial association identifier for use in wireless communications, comprising:
a processor configured to:
generate the partial association identifier based on a first portion of a node identifier of the apparatus if the first portion is not zero, and
generate the partial association identifier based on a second portion of the node identifier of the apparatus if the second portion is not zero and the first portion is zero; and
a transmitter configured to transmit a wireless frame including the generated partial association identifier.

46. The apparatus of claim 45, wherein the node identifier is a basic service set identifier.

47. The apparatus of claim 45, further comprising: a processor configured to generate the partial association identifier based on a third portion of a node identifier if the third portion is not zero and the first and second portions are zero.

48. The apparatus of claim 45, further comprising a processor configured to generate the partial association identifier based on a default value if a non-zero portion of the node identifier is not determined.

49. An apparatus for generating a partial association identifier for use in wireless communications, comprising:
 means for generating the partial association identifier based on a first portion of a node identifier of the apparatus if the first portion is not zero, and
 means for generating the partial association identifier based on a second portion of the node identifier of the apparatus if the second portion is not zero and the first portion is zero; and
 means for transmitting a wireless frame including the generated partial association identifier.

50. The apparatus of claim 49, wherein the node identifier is a basic service set identifier.

51. The apparatus of claim 49, further comprising: means for generating the partial association identifier based on a third portion of a node identifier if the third portion is not zero and the first and second portions are zero.

52. The apparatus of claim 49, further comprising means for generating the partial association identifier based on a default value if a non-zero portion of the node identifier is not determined.

53. A non-transitory computer readable medium comprising instructions that when executed cause a processor to perform a method of generating a partial association identifier for use in wireless communications, the method comprising:
 generating, via a wireless device, the partial association identifier based on a first portion of a node identifier of the wireless device if the first portion is not zero;
 generating, via the wireless device, the partial association identifier based on a second portion of the node identifier of the apparatus if the second portion is not zero and the first portion is zero; and
 transmitting, via the wireless device, a wireless frame including the partial association identifier.

54. The non-transitory computer readable medium of claim 53, wherein the node identifier is a basic service set identifier.

55. The non-transitory computer readable medium of claim 53, the method further comprising: generating the partial association identifier based on a third portion of a node identifier if the third portion is not zero and the first and second portions are zero.

56. The non-transitory computer readable medium of claim 53, the method further comprising instructions that cause a processor to generate the partial association identifier based on a default value if a non-zero portion of the node identifier is not determined.

* * * * *